UNITED STATES PATENT OFFICE.

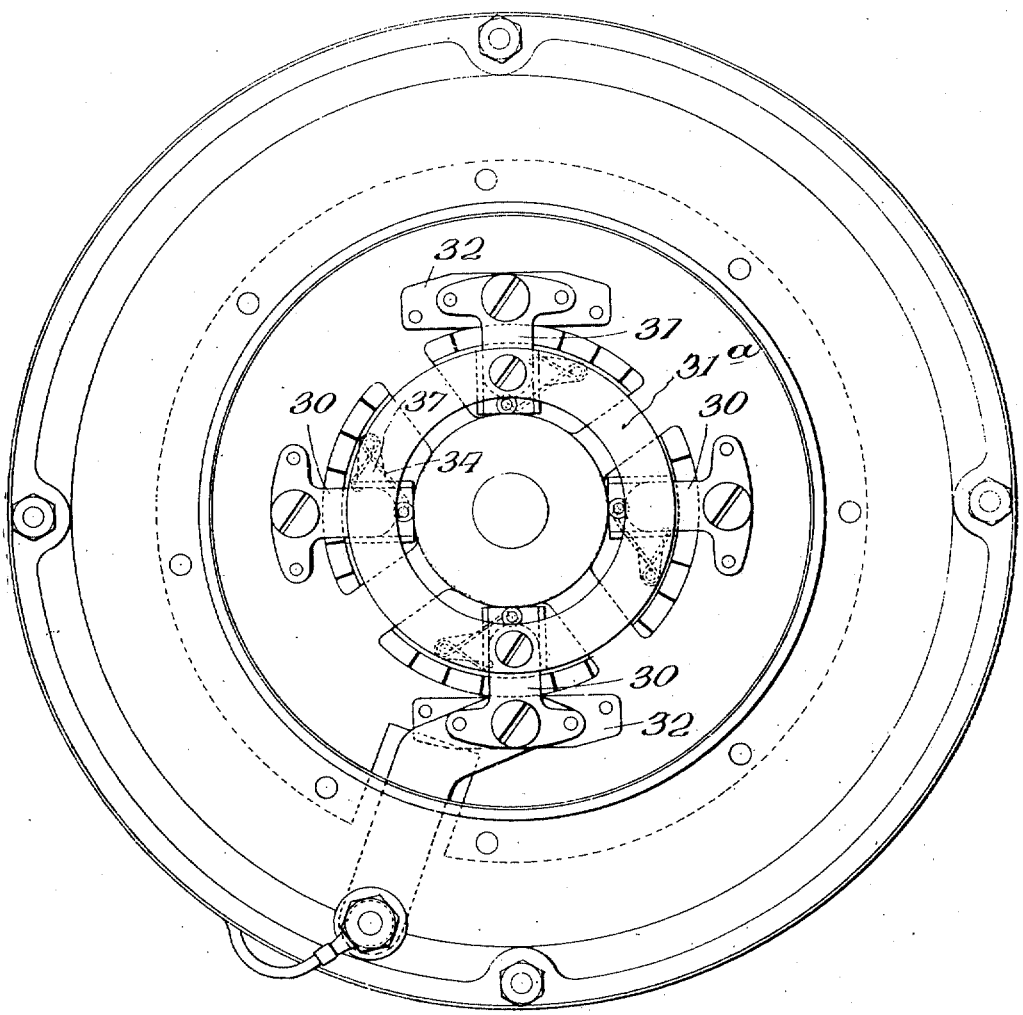

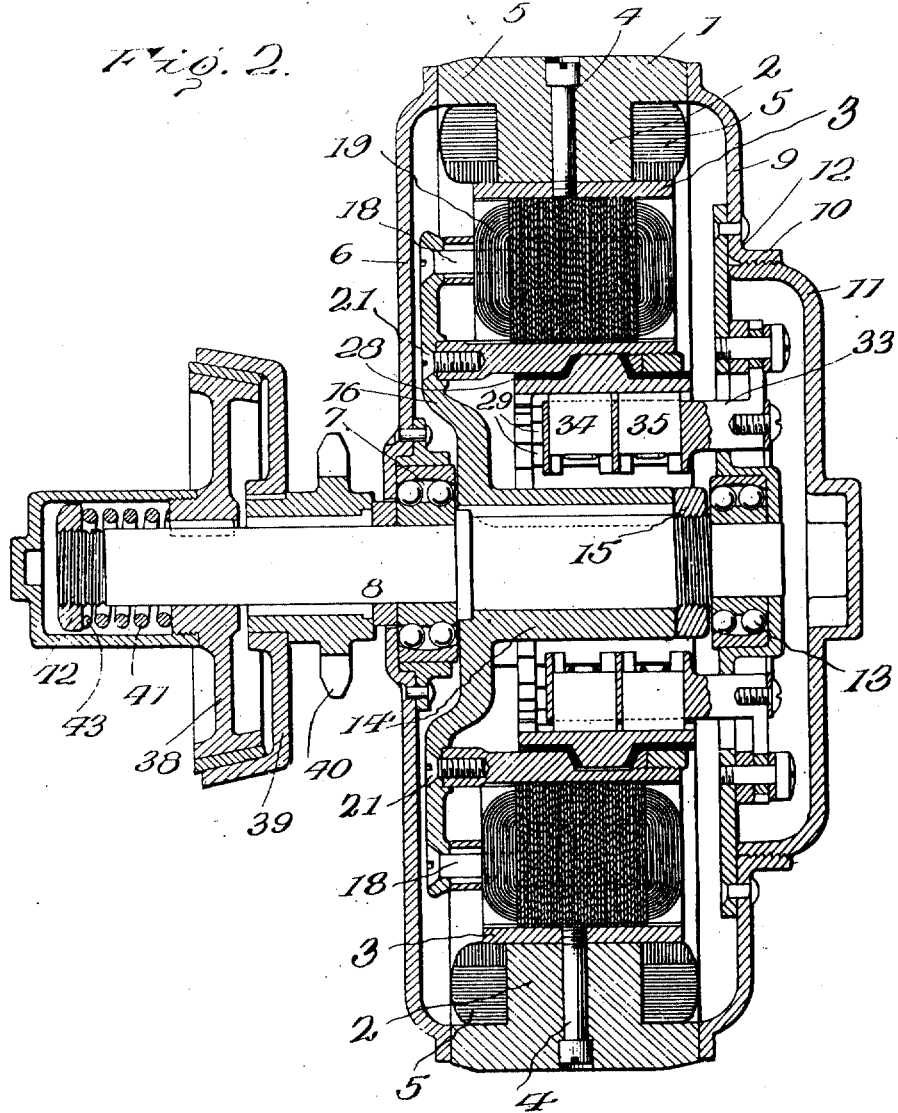

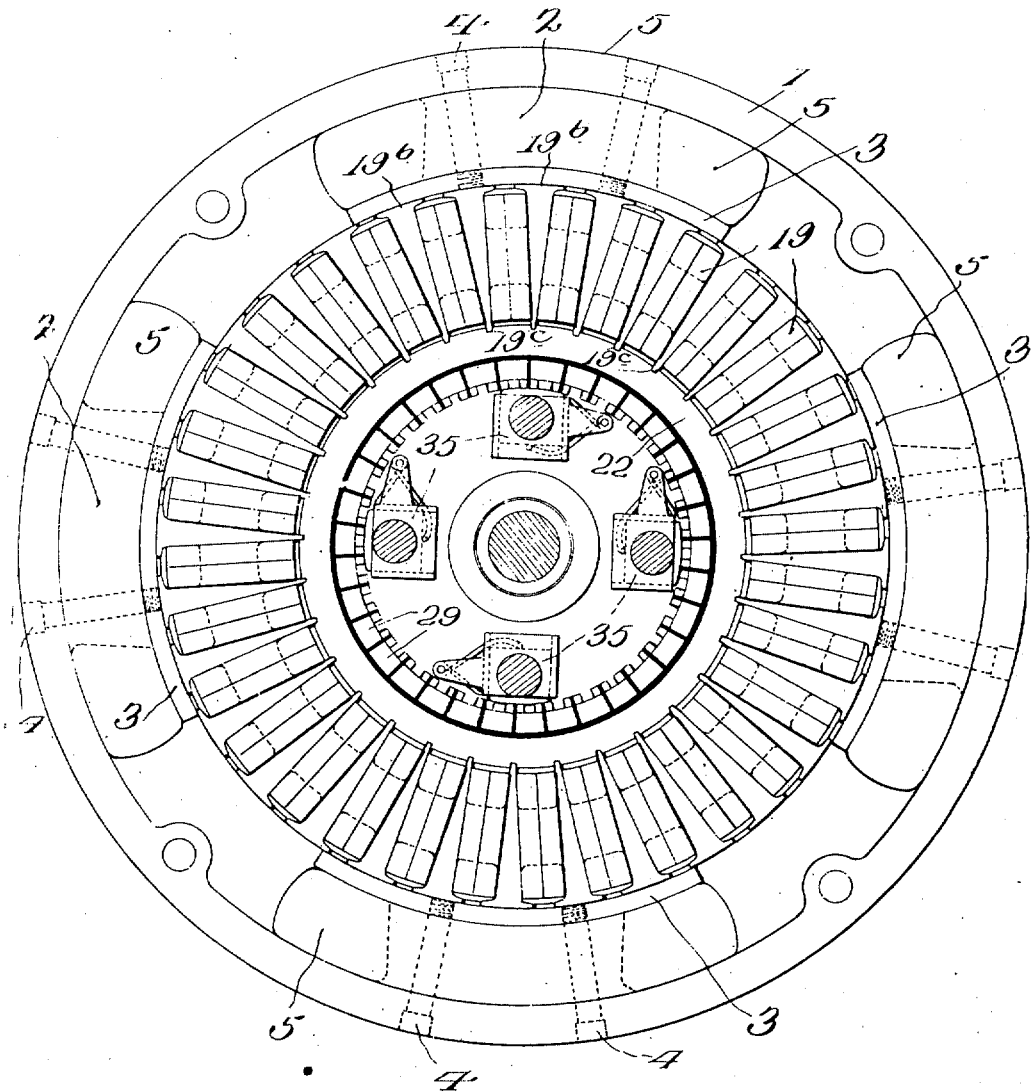

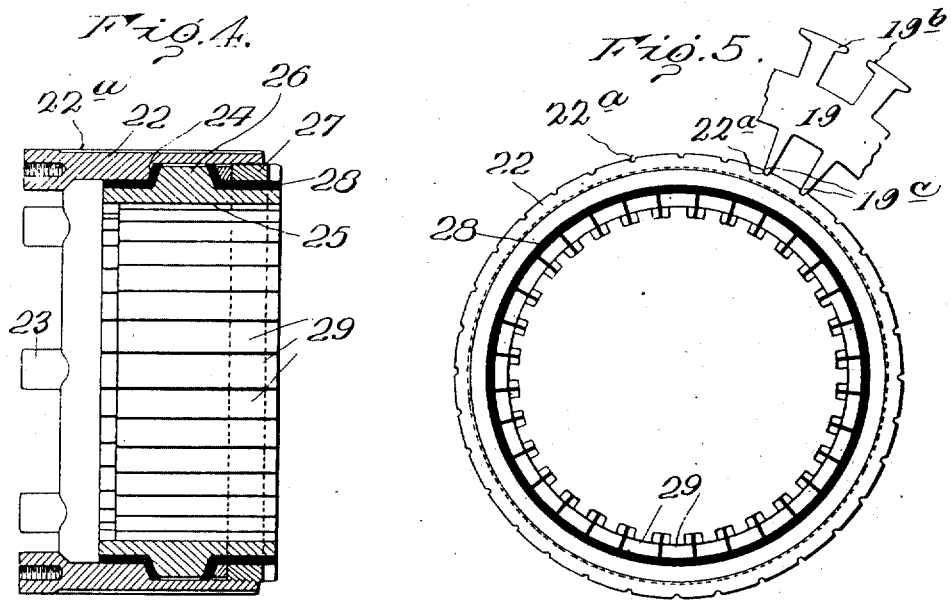
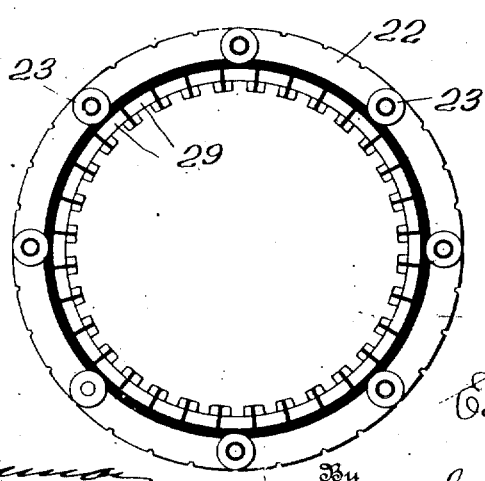

EDWARD B. JACOBSON, OF PITTSFIELD, MASSACHUSETTS, ASSIGNOR TO HENDEE MANUFACTURING COMPANY, OF SPRINGFIELD, MASSACHUSETTS, A CORPORATION OF MASSACHUSETTS.

DYNAMO-ELECTRIC MACHINE.

1,235,803.   Specification of Letters Patent.   Patented Aug. 7, 1917.

Application filed December 3, 1913. Serial No. 804,552.

*To all whom it may concern:*

Be it known that I, EDWARD B. JACOBSON, a citizen of the United States, residing at Pittsfield, in the county of Berkshire, State of Massachusetts, have invented certain new and useful Improvements in Dynamo-Electric Machines, of which the following is a description, reference being had to the accompanying drawing and to the figures of reference marked thereon.

The invention relates to new and useful improvements in direct current dynamo electric machines and more particularly to a dynamo electric machine which is adapted to be used for charging a storage battery and also for starting a prime mover.

An object of the invention is to provide a dynamo electric machine which is of relatively small proportions in a direction longitudinally of the axis of the armature.

A further object of the invention is to provide a dynamo electric machine wherein the pole pull or starting torque shall be relatively high.

A further object is to provide a dynamo electric machine wherein a relatively high charging voltage may be developed at slow armature speed.

These and other objects will in part be obvious and will in part be hereinafter more fully disclosed.

In the drawings, which show by way of illustration one embodiment of the invention, Figure 1 is a front view of a dynamo electric machine embodying my improvements.

Fig. 2 is a sectional view longitudinally of the armature.

Fig. 3 is a front view of the casing, the field pieces, the armature and the commutator.

Fig. 4 is a detail in section showing the commutator removed from the motor.

Fig. 5 is a front end view of the same, and

Fig. 6 is a rear end view of the same.

My improved dynamo electric machine is especially adapted for use in connection with a motor cycle for charging a storage battery carried thereby and for starting the hydrocarbon engine used for propelling the motorcycle. A dynamo electric machine for this purpose must be of relatively small proportions longitudinally of the axis of the armature so that said dynamo electric machine may be disposed in the frame of the motorcycle without unduly projecting laterally therefrom.

A generator used in connection with a motorcycle will be run at widely varying speeds, the motorcycle often being run very slow and again being run very fast. The present dynamo electric machine is especially designed for giving a high efficiency for low speeds and this is accomplished by making the armature of relatively a large diameter so as to increase the rate of travel of the armature coils.

In order to accomplish the above requirements, the dynamo electric machine is so constructed that the armature lies and turns within the field carried by the stationary supporting casing and the armature is formed with an opening centrally therethrough in which is located the commutator. The commutator is formed with an internal contact face. The brush holders project into the opening in the armature and the brushes carried thereby are forced outwardly against the internal face of the commutator. In other words, the field pieces, the armature, the commutator, and the brushes all lie in substantially the same plane and this contributes to a dynamo electric machine wherein the same is of relatively small proportions in a direction longitudinally of the axis of the armature.

Referring more in detail to the drawings, my improved generator consists of a casing 1 which is of cylindrical form and is provided with four inwardly projecting pole pieces 2, each of which is formed with a pole face 3. This pole face is made apparently from the pole piece 2 and is clamped to the pole piece by suitable bolts 4. On each pole piece 2 is placed the field coils 5. My dynamo electric machine is constructed so as to operate as a shunt field generator for charging the storage batteries and so as to operate as a series wound motor for starting the engine. I, therefore, have on each pole piece a shunt field coil and a series field coil. This casing is adapted to be clamped to the frame of the motorcycle, or other supporting member.

At the rear side of the casing 1 is a disk shaped plate 6 which carries a ball bearing 7. The armature shaft 8 is mounted in this ball bearing and rotates therein. At the front of the casing is a front plate 9 which is formed with an enlarged central circular opening. The front plate is provided with a flange 10 at said opening and a threaded cap plate 11 is adapted to engage said threaded flange for closing the opening. A bearing plate 12 is fixed to the front plate 9 and said bearing plate carries a ball bearing 13 which forms the second support for the armature shaft 8.

The armature shaft 8 carries a sleeve 14 which is splined thereto. Said sleeve at its inner end abuts against a shoulder on the shaft and a threaded collar 15, engaging the shaft, holds the sleeve from moving endwise on the armature shaft. This sleeve is keyed to the armature shaft and at its inner end carries an outwardly projecting web or spider 16. The armature is held from lateral movement relative to this web or spider 16 by screws 18. The armature is of the ring type, the armature coil being indicated at 19 in Figs. 2 and 3.

The commutator 20 is fixed to the web or spider 16 by suitable screws 21. The commutator is shown in detail in Figs. 4 and 6 and consists of a supporting shell 22 which is formed with suitable lugs 23 adapted to receive the screws 21, above referred to. This shell is formed with a shoulder 24. The commutator bars 25 are each formed on their outer faces with a lug 26 which is adapted to engage the shoulder 24 or rather suitable insulating material placed between the commutator bars and the supporting shell 22. These commutator bars are clamped against the shoulder by a threaded ring 27 which engages the shell 22. Suitable insulating material 28 is placed between the clamping ring and the commutator bars. The lugs 26 do not contact with the shell 22 and as each of the commutator bars are insulated from each other, I have provided a rigid supporting means for the commutator bars wherein each bar is supported by the supporting shell and insulated from the shell and from each other. The inner faces 29 of the commutator bars are turned smooth so as to form an internal contact face for the brushes.

The rings making up the armature have outer pole faces 19$^b$ and inner pole faces 19$^c$. These inner pole faces engage grooves 22$^a$ in the shell 22. This interlocking of the shell which is rigidly connected to the spider 16 with the armature 19 cause said armature to rotate with the sleeve 14. The armature is held from lateral movement relative to the spider by the screws 18 above referr'd to.

It will be apparent from Fig. 2 of the drawings that the armature is directly within the field pieces and the commutator is also directly within the armature so that this commutator, the armature, and the field pieces lie substantially in the same plane.

The armature coils are connected with the commutator bars in the usual well known way.

Inasmuch as there are four pole pieces there are likewise four brush holders 30 and 31. The brush holders 30 are disposed diametrically opposite each other. These brush holders are secured directly to the bearing plate 12 and are grounded and connected together electrically through said plate. The brush holders 31 are also diametrically opposite each other and these brush holders are mounted on suitable blocks of insulating material 32, which in turn are attached to the bearing plate 12. The brush holders 31 are connected together by a ring 31$^a$ and serve as the positive brush holders for the dynamo electric machine. Each of the brush holders consists of an inwardly projecting arm 33 which extends within the motor and brushes 34 and 35 are mounted in each of these arms and are pressed outwardly by suitable means so that the brushes are kept continuously in contact with the commutator bars. The means for pressing the brushes outwardly, as herein shown, consists of springs 36. These springs are supported by lugs 37 carried by the brush holders and one end of each spring is attached to the holder, while the other end yieldingly presses against the inner face of the brush and thereby forces the brush outwardly into contact with the commutator bars.

From the above construction, it will be apparent that I have provided a dynamo electric machine wherein the armature is supported by a spider located wholly at one side thereof which permits the brush holders to project within the internally faced commutator located within the armature. The armature shaft, however, is provided with a bearing at each side of the dynamo electric machine. The supporting plate 12 is formed with suitable openings through which the brush holders project.

The dynamo electric machine, as shown in Fig. 2 is provided with a friction clutch. The inner member 38 is splined to the armature shaft, while the outer member 39 is connected to a collar which is free thereon. This collar carries a sprocket wheel 40 from which power may be supplied to the armature shaft or taken therefrom when the device is operated as a motor.

A spring 41 engages the friction member 38 which is splined to the armature shaft and is free to slide lengthwise thereof. A collar 42 on the end of the armature shaft serves as an abutment for the spring 41 so that the spring normally holds the friction parts of the clutch in engagement. A cap 43 is secured to the friction member 38 and covers the end of the armature shaft 8.

The armature is formed with inner and outer pole faces. These inner pole faces surround the opening through the armature. The lines of flux will be distributed over wide areas which prevents arcing and prolongs the life of the brushes and the commutator.

Furthermore, the armature is of relative large diameter which increases the starting torque and also provides a relatively high charging voltage and comparative slow speed.

It is obvious that minor changes in the details of construction and arrangement of parts may be made without departing from the spirit of the invention as set forth in the appended claim.

Having thus described my invention, what I claim is:

A dynamo electric machine comprising a shaft, a casing in which said shaft rotates, bearings in said casing for said shaft, field poles carried by said casing, field coils mounted on said poles, a sleeve mounted on said shaft, said sleeve having an outwardly projecting web at one end thereof, a shell fixed to said web and having spaced grooves in its outer face, an armature having inner and outer pole faces, said inner pole faces being adapted to engage the grooves in said shell, means for holding the armature from lateral movement relative to the web, a commutator carried by the inner face of the shell, and brushes adapted to engage said commutator.

In testimony whereof, I affix my signature, in the presence of two witnesses.

EDWARD B. JACOBSON.

Witnesses:
CHARLES L. STURTEVANT,
JOHN D. STEPHENS.